(12) United States Patent
Murray

(10) Patent No.: US 8,489,299 B2
(45) Date of Patent: Jul. 16, 2013

(54) METHOD AND DEVICE FOR DETERMINING MOTOR VEHICLE ACCELERATION

(75) Inventor: Stephen William Murray, Grimsargh (GB)

(73) Assignee: Torotrak (Development) Limited, Leyland, Lancashire (GB)

( * ) Notice: Subject to any disclaimer, the term of this patent is extended or adjusted under 35 U.S.C. 154(b) by 1399 days.

(21) Appl. No.: 10/564,696

(22) PCT Filed: Jun. 3, 2004

(86) PCT No.: PCT/GB2004/002348
§ 371 (c)(1),
(2), (4) Date: Jul. 10, 2006

(87) PCT Pub. No.: WO2005/015244
PCT Pub. Date: Feb. 17, 2005

(65) Prior Publication Data
US 2007/0112495 A1  May 17, 2007

(30) Foreign Application Priority Data
Jul. 12, 2003 (GB) .................................. 0316382.1

(51) Int. Cl.
*G06F 7/00* (2006.01)
(52) U.S. Cl.
USPC .................. 701/70; 701/36; 701/71; 701/82; 701/83; 701/84; 701/87; 701/99; 701/102; 340/467
(58) Field of Classification Search
None
See application file for complete search history.

(56) References Cited

U.S. PATENT DOCUMENTS

| | | | | |
|---|---|---|---|---|
| 5,012,417 A | * | 4/1991 | Watanabe et al. | 701/71 |
| 5,123,714 A | * | 6/1992 | Mori | 303/199 |
| 5,402,345 A | * | 3/1995 | Kost | 701/74 |
| 5,425,574 A | * | 6/1995 | Sano | 303/177 |
| 5,579,230 A | * | 11/1996 | Lin et al. | 701/70 |
| 5,615,933 A | * | 4/1997 | Kidston et al. | 303/152 |
| 5,706,196 A | * | 1/1998 | Romstadt | 701/37 |
| 5,873,639 A | * | 2/1999 | Takahashi et al. | 303/194 |
| 6,071,209 A | | 6/2000 | Greenwood | |
| 6,202,780 B1 | * | 3/2001 | Tanaka et al. | 180/179 |

(Continued)

FOREIGN PATENT DOCUMENTS

| | | |
|---|---|---|
| DE | 43 28 893 A1 | 3/1994 |
| EP | 0832376 A1 | 4/1998 |

(Continued)

OTHER PUBLICATIONS

PCT International Search Report and Written Opinion for PCT/GB2004/002348, mailed Sep. 13, 2004, 16 pages.

*Primary Examiner* — Jonathan M Dager
(74) *Attorney, Agent, or Firm* — Blakely, Sokoloff, Taylor & Zafman LLP

(57) ABSTRACT

A method is disclosed for obtaining a signal representing motor vehicle acceleration. The method involves obtaining a high pass filtered vehicle acceleration signal and a low pass filtered vehicle acceleration signal. One of these signals (preferably the high pass filtered signal) is obtained based upon the net driving force applied to the vehicle, which can be used to obtain an estimate of acceleration by means of an adoptive vehicle model (28). The other signal is obtained by measurement, for example by differentiating a measured vehicle speed signal with respect to time. Adding the two filtered signals together gives a vehicle acceleration signal of potentially good quality.

6 Claims, 3 Drawing Sheets

U.S. PATENT DOCUMENTS

| | | | |
|---|---|---|---|
| 6,349,255 B1* | 2/2002 | Heckmann et al. | 701/70 |
| 6,370,459 B1* | 4/2002 | Phillips | 701/41 |
| 6,614,343 B1* | 9/2003 | Fennel et al. | 340/425.5 |
| 6,697,611 B1* | 2/2004 | Franca-Neto | 455/296 |
| 2002/0036429 A1* | 3/2002 | Shimada et al. | 303/152 |
| 2002/0075142 A1* | 6/2002 | Foo et al. | 340/440 |
| 2002/0075143 A1* | 6/2002 | Foo et al. | 340/440 |
| 2002/0099490 A1* | 7/2002 | Wakamatsu et al. | 701/90 |
| 2003/0058118 A1* | 3/2003 | Wilson | 340/679 |
| 2003/0141128 A1* | 7/2003 | Hessmert et al. | 180/233 |
| 2003/0158648 A1* | 8/2003 | Kubota et al. | 701/96 |
| 2004/0166824 A1* | 8/2004 | Franca-Neto | 455/296 |
| 2004/0176899 A1* | 9/2004 | Hallowell | 701/84 |
| 2004/0199300 A1* | 10/2004 | Gustafsson et al. | 701/1 |
| 2005/0000305 A1* | 1/2005 | Yamada et al. | 73/865 |
| 2006/0074558 A1* | 4/2006 | Williamson et al. | 701/213 |
| 2009/0123009 A1* | 5/2009 | Roeck et al. | 381/317 |

FOREIGN PATENT DOCUMENTS

| | | |
|---|---|---|
| EP | 1 013 523 A2 | 6/2000 |
| EP | 1 085 312 A2 | 3/2001 |
| WO | WO 99/46604 | 9/1999 |

* cited by examiner

METHOD AND DEVICE FOR DETERMINING MOTOR VEHICLE ACCELERATION

This is a National Phase of International Application No. PCT/GB2004/002348, filed on June 3, 2004, which claims priority from Great Britain Patent Application No. 0316382.1, filed on July 12, 2003.

FIELD

The present invention concerns a method and device for determining acceleration of a motor vehicle.

BACKGROUND

It is of course known to measure vehicle acceleration by means e.g. of some form of accelerometer, or alternatively by measuring the speed of the vehicle wheels and differentiating with respect to time. Unfortunately the vehicle, due to its suspension etc., and the driveline, due to its compliance, have dynamics exhibiting resonance at frequencies which can be as low as 2 Hz in motor cars and still lower in larger vehicles. This can create corresponding oscillation in measured acceleration signals. Signal noise can also be a problem. The signal can be filtered to improve its quality but a filter with a time constant long enough to remove the low frequency oscillation would introduce an appreciable time lag.

The problem is experienced in connection with electronic systems for control of vehicle powertrains. The present invention has in fact been developed for use in a system which controls a powertrain using a continuously variable transmission of so-called "torque controlled" type (the term is known in the art and transmissions of this type have for example been described in European patent 832376 and its US counterpart U.S. Pat. No. 6,071,209, both granted to Torotrak (Development) Limited). In such transmissions variator ratio is not directly set, but instead transmission ratio is able to change in accordance with changes in engine and vehicle speed. To determine rate of ratio change, vehicle acceleration is required. The rate of ratio change is needed for various purposes in controlling the powertrain. If a simple low pass filter were used with a long enough time constant to remove the low frequency oscillation from a measured value of vehicle acceleration, the speed of response of the control system would be unacceptably compromised.

SUMMARY

In accordance with a first aspect of the present invention there is a method of determining acceleration of a motor vehicle, comprising obtaining a high pass filtered acceleration signal and a low pass filtered acceleration signal, one of the filtered acceleration signals being obtained based upon net driving force applied to the vehicle and the other being obtained by measurement, and adding the two filtered acceleration signals to obtain an output signal representing vehicle acceleration.

BRIEF DESCRIPTION OF THE DRAWINGS

Specific embodiments of the present invention will now be described, by way of example only, with reference to the accompanying drawings in which.

DETAILED DESCRIPTION

The embodiment of the invention to be described below provides improved quality signals representing both vehicle speed and vehicle acceleration and does so by using a combination of measured and predicted vehicle speed/acceleration values.

Figure 1:
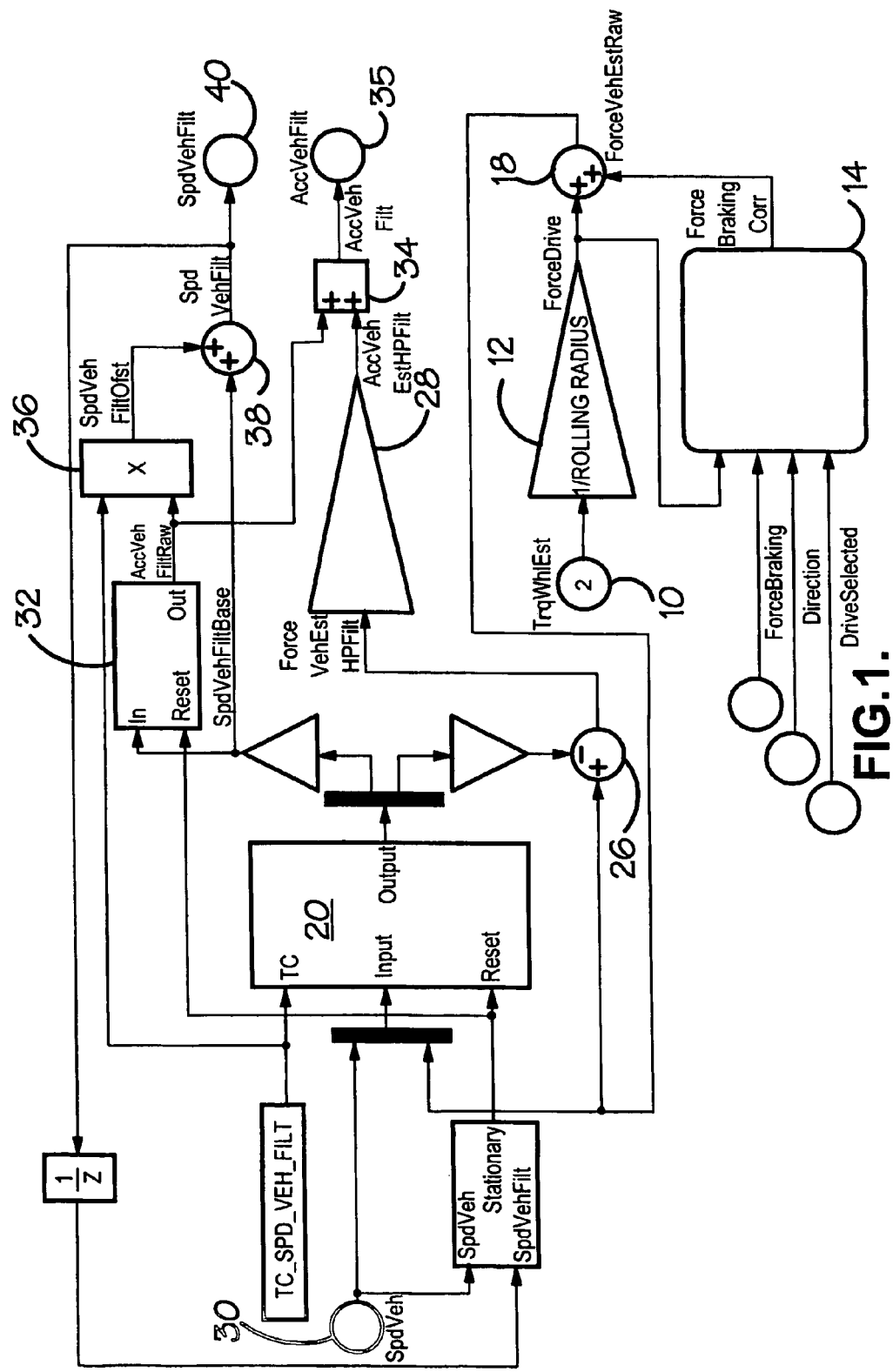
FIG. 1 is a block diagram of a software-implemented filtering strategy embodying the present invention.

A predicted vehicle acceleration value is obtained on the basis of the force applied by the motor vehicle's powertrain and brakes. In FIG. 1 the variable TrqWhlEst, input at box 10, represents an estimated, unfiltered value of the torque applied to the driven wheels of the motor vehicle by the powertrain, obtained from an electronic model of the powertrain. Dividing this torque by the rolling radius of the vehicle driven wheels at 12 gives a value for the force applied by the powertrain to accelerate the vehicle (ForceDrive). To allow for the additional force applied by the brakes, the brake pressure is measured and braking force (ForceBraking in FIG. 1) is then calculated based upon the pressure/force characteristics of the brakes. The relationship between brake pressure and brake force is essentially linear, so that this is a straightforward calculation. The function labelled 14 in FIG. 1 receives ForceBraking and ForceDrive, as well as indications of direction of vehicle travel (forward/reverse) and of the position of the vehicle drive control, and in dependence upon these outputs a corrected value ForceBrakingCorr of the brake force. Adding this at 18 to ForceDrive gives an unfiltered signal ForceVehEstRaw representing the net driving force being applied by engine and brakes to accelerate the vehicle.

Figure 2:
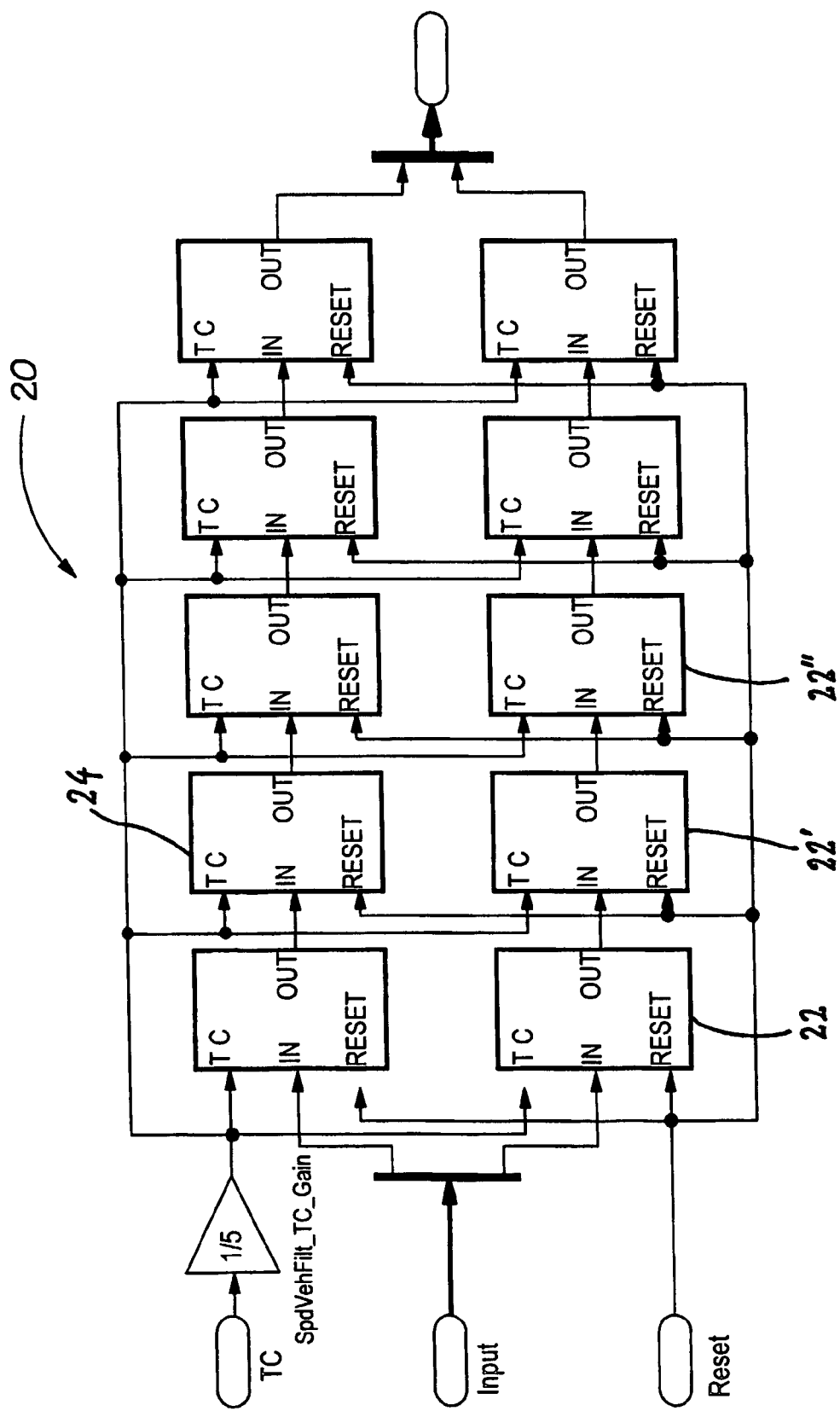
FIG. 2 is a more detailed representation, again in block diagram form, of an actual filter used in the FIG. 1 strategy.

This signal ForceVehEstRaw is passed to a multiple order filter 20, which is seen in more detail in FIG. 2 and comprises a series of low pass, first order, digitally implemented filters 22 for filtering the net driving force signals ForceVehEstRaw, as well as a further series of identical filters 24 for filtering a vehicle speed signal, as will be explained below. The output of one filter such as 22 is fed to the input of its neighbour 22' and so on in the series, so that together they provide a high order, low pass filter with a relatively sharp frequency cut off and a time constant TC, a common parameter which is input to the filters.

The term "low pass filter" is well understood by those skilled in the art and is used here in its conventional sense, to refer to a filter which passes signal components below a chosen frequency (dictated by the time constant) but discriminates against higher frequencies. The term "high pass filter" will also be used herein and is again used in its conventional and well understood sense to refer to a filter whose transmission band extends upwards from a chosen frequency, lower frequencies being discriminated against.

The output from the filter 20 is a low pass filtered, estimated value ForceVehEstFilt (FIG. 1) of the force acting upon the vehicle. At 26 this is taken from the unfiltered value ForceVehEstRaw to provide what is in effect a high pass filtered version ForceVehEstHPFilt. This is then input to an adaptive model 28 of the vehicle. The model serves to output a high pass filtered estimate AccVehEstHPFilt of the vehicle acceleration.

The simplest possible model 28 would involve only division of the driving force ForceVehEstFilt by the vehicle mass. For greater accuracy it is necessary to take account of vehicle mass, road gradient, drag and potentially other factors. Mass and gradient are of course variable and are not directly measured. Hence a more sophisticated model is adaptive, making corrections to these variables based upon the vehicle's response.

AccVehEstHPFilt has been obtained based upon the vehicle mass and the force applied to it. Another way to obtain a value for vehicle acceleration is to measure vehicle speed and then differentiate with respect to time. In FIG. 1 the measured vehicle speed, itself a signal which incorporates a good deal of noise, is indicated as SpdVeh at 30 and is input to the multiple order filter 20 and specifically to the series of filters 24. The resulting low pass filtered signal is passed to a digital differentiator 32 to provide a low pass filtered estimate AccVehFiltRaw of the vehicle acceleration.

At 34 the high pass filtered signal AccVehEstHPFilt is added to the low pass filtered signal AccVehFiltRaw to provide at 35 an output signal AccVehFilt which is a very close approximation to the true value of the vehicle acceleration, as trials have demonstrated. The low frequency noise due to drive line oscillation has been removed by virtue of the low pass filtering of the measured vehicle speed signal. The time lag introduced by the low pass filter has been corrected by addition of the high pass filtered estimate of acceleration based upon the transmission/brake force.

To now explain how a usable value of vehicle speed is obtained, note that the low pass filtered value of vehicle acceleration AccVehFiltRaw, obtained by differentiation of measured vehicle speed, is led to a multiplier 36 which also receives the time constant TC of the multiple pass filter 20. Multiplying AccVehFiltRaw by TC gives an offset SpdVehFiltOfst which is an estimate of the difference between the actual and filtered values of the vehicle speed introduced due to the time lag from the filter 20. Adding this offset at 38 to the low pass filtered measured vehicle speed signal, SpdVehFiltBase gives an improved, filtered vehicle speed signal SpdVehFilt.

Figure 3:
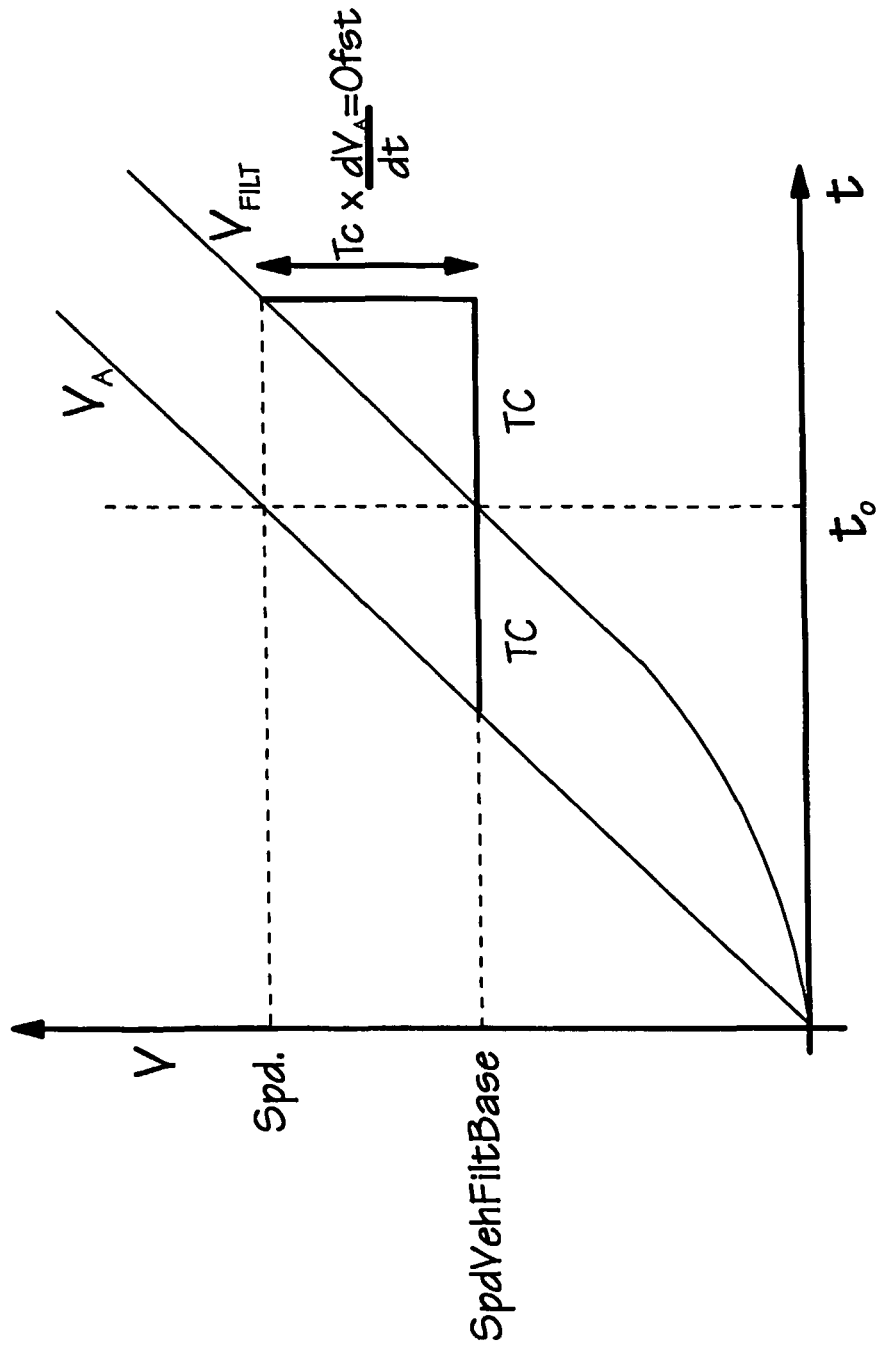
FIG. 3 is a graph showing actual and measured vehicle speed values (vertical axis) against time (horizontal axis).

FIG. 3 is intended to make the significance of the offset SpdVehFiltOfst clear. $V_A$ represents actual vehicle speed and in this example is a straight line corresponding to constant vehicle acceleration. There is a time lag, determined by the time constant TC, between the actual speed $V_A$ and the measured, filtered signal $V_{FILT}$. Consequently at an arbitrarily chosen point in time, $t_0$, the value SpdVehFiltBase of the filtered signal $V_{FILT}$ is different from the actual speed Spd. The difference is in the illustrated example equal to the gradient of the filtered signal $V_{FILT}$ multiplied by the time lag TC. Adding the offset SpdVehFiltOfst, calculated as explained above, thus gives a value thus SpdVehFilt which is equal to the true value Spd. The offset is precisely correct in this example only because the vehicle acceleration is constant. If the acceleration varies then there will be some discrepancy between SpdVehFilt and Spd, but the method provides a great improvement over the raw filtered value.

A reset function 42 receives the measured and the filtered vehicle speed signals SpdVeh and SpdVehFilt and resets the filter 20 when these indicate that the vehicle is stationary. All of the functions illustrated in FIGS. 1 and 2 are typically carried out by a suitably programmed microprocessor.

The invention claimed is:

1. A method of determining acceleration of a motor vehicle, the method comprising:
    obtaining by measurement a first signal representing vehicle speed, differentiating, by a microprocessor, the first signal with respect to time, and low pass filtering, by the microprocessor, the first signal to provide a first filtered acceleration signal;
    obtaining, by the microprocessor, a second filtered acceleration signal by calculating a net driving force acting on the vehicle, calculating an estimated vehicle acceleration from the net driving force, and high pass filtering the estimated vehicle acceleration; and
    adding, by the microprocessor, the first and second filtered acceleration signals to obtain an output signal representing vehicle acceleration.

2. The method as claimed in claim 1 wherein net driving force is obtained by subtracting vehicle braking force from driving force applied through driven vehicle wheels.

3. The method as claimed in claim 1 wherein net driving force is supplied to an adaptive vehicle model to obtain an estimate of vehicle acceleration.

4. The method as claimed in claim 3 wherein net driving force is high pass filtered before being supplied to the adaptive model.

5. The method as claimed in claim 1 wherein the high pass filtering is carried out by low pass filtering and subtracting the low pass filtered signal from the unfiltered signal.

6. A device for determining acceleration of a motor vehicle, the device comprising:
    a microprocessor configured to
        receive a first signal representing measured vehicle speed, differentiate the first signal with respect to time, and cause the first signal to be low pass filtered to provide a first filtered acceleration signal,
        calculate a second filtered acceleration signal by calculating a net driving force acting on the vehicle, calculating an estimated vehicle acceleration from the net driving force, and high pass filtering the estimated vehicle acceleration, and
        add the first and second filtered acceleration signals to obtain an output signal representing vehicle acceleration.

* * * * *